US011215706B2

United States Patent
DiPoala

(10) Patent No.: US 11,215,706 B2
(45) Date of Patent: Jan. 4, 2022

(54) HIGH SECURITY MOTION SENSOR

(71) Applicant: Robert Bosch GmbH, Stuttgart (DE)

(72) Inventor: William DiPoala, Fairport, NY (US)

(73) Assignee: Robert Bosch GmbH, Stuttgart (DE)

( * ) Notice: Subject to any disclaimer, the term of this patent is extended or adjusted under 35 U.S.C. 154(b) by 348 days.

(21) Appl. No.: 16/325,687

(22) PCT Filed: Aug. 18, 2017

(86) PCT No.: PCT/US2017/047610
§ 371 (c)(1),
(2) Date: Feb. 14, 2019

(87) PCT Pub. No.: WO2018/035460
PCT Pub. Date: Feb. 22, 2018

(65) Prior Publication Data
US 2019/0212432 A1     Jul. 11, 2019

Related U.S. Application Data

(60) Provisional application No. 62/377,362, filed on Aug. 19, 2016, provisional application No. 62/376,790, filed on Aug. 18, 2016.

(51) Int. Cl.
*G01S 13/56* (2006.01)
*G01S 13/88* (2006.01)
(Continued)

(52) U.S. Cl.
CPC .............. *G01S 13/56* (2013.01); *G01P 13/00* (2013.01); *G01S 13/524* (2013.01); *G01S 13/886* (2013.01)

(58) Field of Classification Search
CPC ........ G01P 13/00; G01S 13/524; G01S 13/56; G01S 13/886
See application file for complete search history.

(56) References Cited

U.S. PATENT DOCUMENTS 5,450,062 A    9/1995 DiPoala
6,206,340 B1   3/2001 Paese et al.
(Continued)

FOREIGN PATENT DOCUMENTS

WO    2000/06870 A1    11/2000

OTHER PUBLICATIONS

Notification of Transmittal of the International Search Report and the Written Opinion of the International Searching Authority, International Appl. No. PCT/US2017/047610; dated Oct. 24, 2017.
(Continued)

*Primary Examiner* — Timothy X Pham
(74) *Attorney, Agent, or Firm* — Michael Best & Friedrich LLP

(57) ABSTRACT

A device and method for detecting motion using an adjustable detection shell. The motion detector includes an antenna; a reception circuit configured to receive a reflected radio frequency (RF) signal via the antenna; a time gate circuit electrically connected to the reception circuit and configured to generate a control signal for the reception circuit based on a timing setpoint signal; and an electronic processor electrically connected to the reception circuit and the time gate circuit. The electronic processor is configured to receive a signal from the reception circuit indicative of motion occurring within a detection shell that is adjustable via the timing setpoint signal. The signal is based on the reflected RF signal. The electronic processor is further configured to generate a notification when the signal received from the reception circuit is indicative of motion occurring within the detection shell.

20 Claims, 5 Drawing Sheets

(51) Int. Cl.
*G01S 13/524* (2006.01)
*G01P 13/00* (2006.01)

(56) References Cited

U.S. PATENT DOCUMENTS

| | | | |
|---|---|---|---|
| 6,239,736 B1 | 5/2001 | McDonald et al. | |
| 2005/0128067 A1 | 6/2005 | Zakrewski | |
| 2005/0195101 A1* | 9/2005 | Stevens | G01S 13/56 |
| | | | 342/28 |
| 2007/0230747 A1 | 10/2007 | Dunko | |
| 2009/0079563 A1* | 3/2009 | Tsuji | G01V 8/005 |
| | | | 340/552 |
| 2011/0095936 A1* | 4/2011 | Yuanzhu | G01S 7/282 |
| | | | 342/27 |
| 2015/0204966 A1* | 7/2015 | Kishigami | G01S 13/02 |
| | | | 342/189 |
| 2017/0363729 A1* | 12/2017 | DiPoala | G01S 13/04 |

OTHER PUBLICATIONS

Australian Patent Office Action for Application No. 2017313146 dated Apr. 21, 2021 (3 pages).
Australian Patent Office Examination Report No. 2 for Application No. 2017313146 dated Jun. 11, 2021 (4 pages).

* cited by examiner

HIGH SECURITY MOTION SENSOR

RELATED APPLICATIONS

The present application claims priority to U.S. Provisional Patent Application No. 62/376,790, filed Aug. 18, 2016, the entire contents of which are hereby incorporated by reference, and U.S. Provisional Patent Application No. 62/377,362, filed Aug. 19, 2016, the entire contents of which are hereby incorporated by reference.

FIELD

Embodiments relate to motion detection alarm systems.

BACKGROUND

Modern motion detectors for security systems are designed to generate alarms when persons move within a surveillance area. Motion detectors commonly use radio frequency (RF) reflections from objects within the surveillance area to detect motion. However, motion detectors may sense motion from objects that are not of security concern and generate false alarms. For example, a heating/air-conditioning duct, a ceiling fan, a door opening and other things may disturb objects within the surveillance area and result in false alarms.

SUMMARY

Embodiments provide, among other things, a system and a method of motion detection that address the above-listed problems. Embodiments provide a motion detector that uses time-gated radar and does not require passive infrared radar (PIR). The motion detector processes radio frequency (RF) reflections from objects using an adjustable receiver channel. The reception circuit generates a signal for motion detection within an adjustable range. The motion detector thereby detects motion in a surveillance area that is configurable to provide detection shells around important objects (for example, display cases, cash registers, entryways, etc.) while reducing false alarms generated by the sources described above.

One embodiment provides a motion detector with an adjustable detection shell. The motion detector includes an antenna; a reception circuit configured to receive a reflected radio frequency (RF) signal via the antenna; a time gate circuit electrically connected to the reception circuit and configured to generate a control signal for the reception circuit based on a timing setpoint signal; and an electronic processor electrically connected to the reception circuit and the time gate circuit. The electronic processor is configured to receive a signal from the reception circuit indicative of motion occurring within a detection shell that is adjustable via the timing setpoint signal. The signal is based on the reflected RF signal. The electronic processor is further configured to generate a notification when the signal received from the reception circuit is indicative of motion occurring within the detection shell.

Another embodiment provides a method of operation of a motion detector with an adjustable detection shell. The method includes receiving, at a time gate circuit, a timing setpoint signal and generating a control signal by the time gate circuit for a reception circuit based on the timing setpoint signal. The method also includes receiving a reflected RF signal at the reception circuit and receiving, at an electronic processor, a signal from the reception circuit indicative of motion occurring within a detection shell. The method includes generating, by the electronic processor, a notification when the signal from the reception circuit is indicative of motion occurring within the detection shell.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

Figure 1:
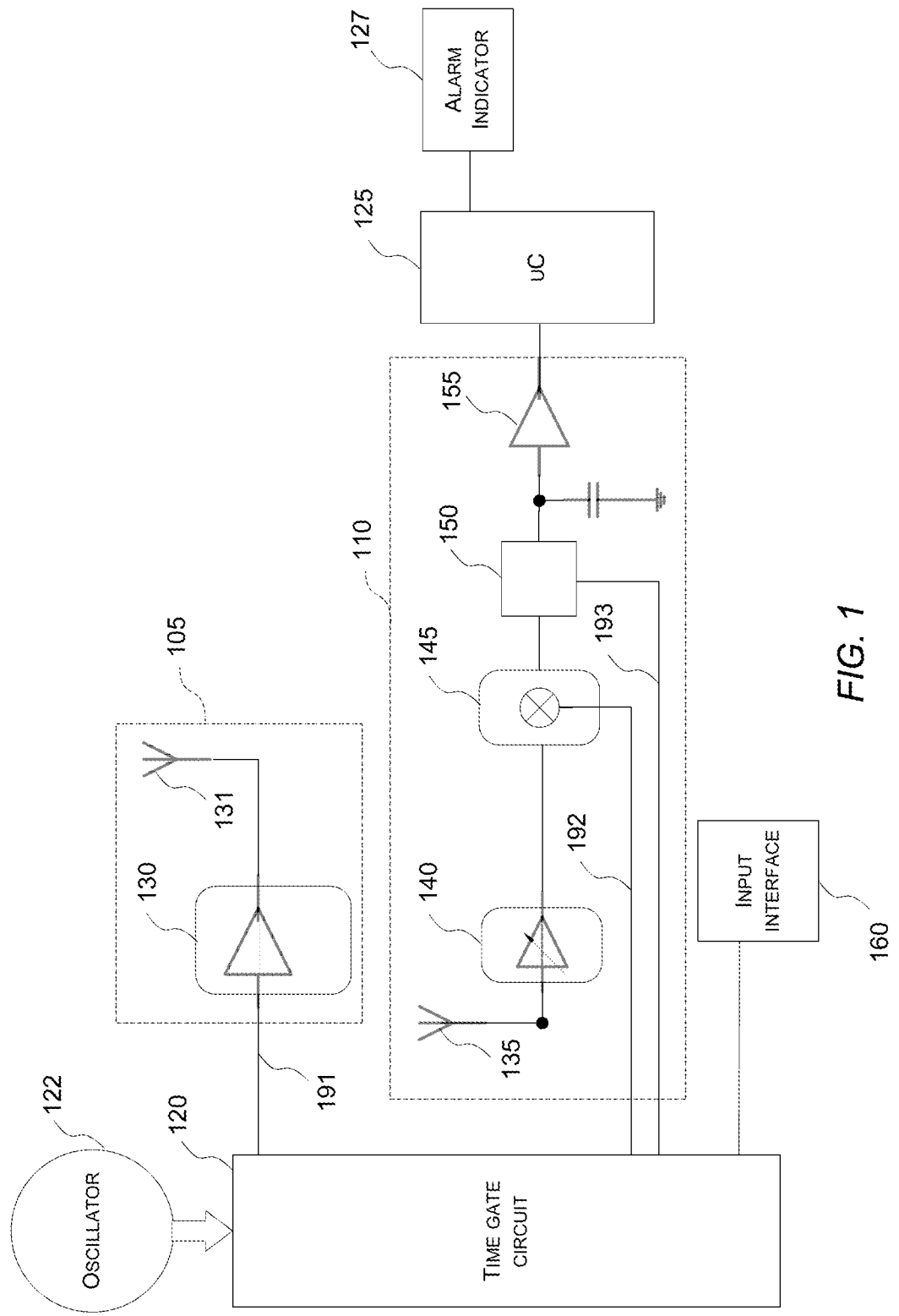
FIG. 1 is a block diagram of motion detector with an adjustable detection shell according to one embodiment.

FIG. 1 illustrates one embodiment of a motion detector 100 with an adjustable detection shell. In the embodiment illustrated, the motion detector 100 includes a radio frequency (RF) transmission circuit 105 and a reception circuit 110. A time gate circuit 120 is electrically connected to the RF transmission circuit 105 and the reception circuit 110. The time gate circuit 120 is also electrically connected to an oscillator 122. The time gate circuit 120 includes discrete hardware such as capacitors and resistors to set control timing and synchronicity of transmission and reception of radio frequency (RF) signals. The time gate circuit 120 is configured to send control signals to the RF transmission circuit 105 and the reception circuit 110 based on the frequency of the oscillator 122.

The motion detector 100 also includes a microcontroller 125 and an alarm indicator 127. The microcontroller 125 is configured to receive a signal from the reception circuit 110. Based on the received signal, the microcontroller 125 is configured to generate one or more notifications to send to the alarm indicator 127.

In some embodiments, the alarm indicator 127 is incorporated within the motion detector 100. For example, the motion detector 100 may include a visual indicator (for example, a light, a display, etc.), an audial indicator (a beep, siren, tone, etc.), or both positioned at the motion detector 100. In other embodiments, the alarm indicator 127 is located at a location external to the motion detector 100. For example, the motion detector 100 may include one or more digital outputs that are communicatively connected to the alarm indicator 127. In this instance, the motion detector 100 may communicate with the alarm indicator 127 via a wired or wireless connection. In some embodiments, the alarm indicator 127 is incorporated into a central computer system such as a security alarm system or building control system.

The RF transmission circuit 105 includes an RF shape generator 130 (for example, a circuit that provides a shaped RF burst), and a transmission antenna 131. The time gate circuit 120, the RF shape generator 130, and the transmission antenna 131 operate in conjunction to generate and transmit RF pulses (for example, microwave pulses) designed to reflect from objects within an area under surveillance. In some embodiments, the RF shape generator 130 generates RF bursts in the microwave spectrum including, for example, an RF burst centered at 7.5 GHz. Timing of the transmission of the RF burst is controlled by the time gate circuit 120. In one embodiment, the RF burst is transmitted repeatedly and periodically at 1 microsecond intervals. In one example, when the RF burst is centered at 7.5 GHz, the RF burst occurs within a short timespan (for example, 2 ns). The RF burst is generated within ECC-Dec0604 requirements for wireless transmission. Additionally, the RF burst is shaped to be in compliance with RF spectral density requirements regulated by the Federal Communications Commission (FCC) or the European Commission.

The reception circuit 110 receives RF reflections via a reception antenna 135. The RF reflections are reflected from objects within the area under surveillance. The reception circuit 110 includes an amplifier 140 (for example, a low-noise amplifier or a gain control amplifier), a mixer 145, a sample-and-hold circuit 150, and an operational amplifier (op-amp) 155. The above-listed components are electrically connected in series in the order listed from the reception antenna 135 to the operational amplifier 155. The mixer 145 and the sample-and-hold circuit 150 are electrically connected to the time gate circuit 120 and, during operation, receive control signals from the time gate circuit 120.

The motion detector 100 also includes an input interface 160. The input interface 160 is communicatively connected to the time gate circuit 120. The input interface 160 is configured to receive a selection by a user (for example, a security system installer) that selects a particular detection shell within the surveillance area and to send a timing setpoint signal to the time gate circuit 120 based on the selection. In some embodiments, the detection shell may be adjusted via the input interface 160 by setting multiple parameters of the detection shell including, for example, an average distance (i.e., average range) from the motion detector 100 and a width of the detection shell.

In some embodiments, the input interface 160 is configured as an external computing device (for example, a computer terminal) that inputs a digital control signal indicative of multiple parameters defining the detection shell to the time gate circuit 120. The time gate circuit 120 adjusts the control signal to the sample-and-hold circuit 150 according to the signal received from the input interface 160. The input interface 160 may be securely configured for use only by select personnel such as an installer of the motion detector 100.

The input interface 160 may include one or more mechanical input mechanisms for receiving user selections and adjustments. In one embodiment, the input interface 160 includes mechanical inputs positioned on a housing of the motion detector 100. In one embodiment, the input interface 160 includes a dial that is adjustable over a range. In this instance, the range of the dial corresponds to an adjustable range of the detection shell. The input interface 160 may include various input mechanisms including, for example, buttons, toggles, sliders, dials, and others.

Figure 2:
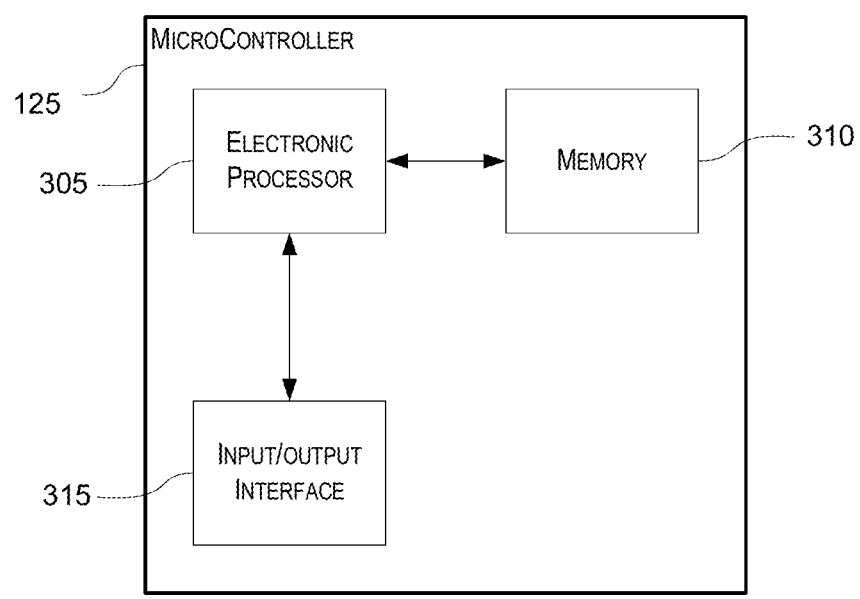
FIG. 2 is a block diagram of a controller for the motion detector of FIG. 1 according to one embodiment.

FIG. 2 is a block diagram of the microcontroller 125 of the motion detector 100 according to one embodiment. The microcontroller 125 includes a plurality of electrical and electronic components that provide power, operational control, and protection to the components and modules within the microcontroller 125. The microcontroller 125 includes, among other things, an electronic processor 205 (such as a programmable electronic microprocessor, microcontroller, or similar device), a memory 210 (for example, non-transitory, machine readable memory), and an input/output interface 215. In some embodiments, the microcontroller 125 includes additional, fewer, or different components.

The microcontroller 125 may be implemented in multiple electronic processors, application specific integrated circuits (ASICs), and other hardware configurations. The microcontroller 125 is configured to receive and process a signal from the reception circuit 110. For example, the electronic processor 205 is configured to retrieve from memory 210 and execute, among other things, instructions related to comparing the signal to a threshold and activing the alarm indicator 127 based on the threshold.

During operation of the motion detector 100, the mixer 145 generates a difference signal based on the RF reflections. The difference signal is indicative of motion occurring within the area under surveillance. The difference signal is generated by the mixer 145 and has its properties determined by an amount of motion occurring within the area under surveillance. The difference signal is dependent on the control signal generated by the time gate circuit 120. Thus, when timing of the time gate circuit 120 is configured, the difference signal becomes indicative of motion at a particular range.

The sample-and-hold circuit 150 generates a continuous-wave, Doppler signal based on the difference signal. In some embodiments, the Doppler signal is a low frequency signal (for example, 0.1 to 100 Hz signals) that is then amplified by the operational amplifier 155. The Doppler signal results in the signal that is output from the reception circuit 110. The signal is indicative of motion occurring within the detection shell. The signal is then input to the microcontroller 125. The sample-and-hold circuit 150 samples the difference signal at intervals that are set by the input interface 160. As a consequence, the signal is indicative of motion occurring at particular distances from the motion detector 100.

Figure 3:
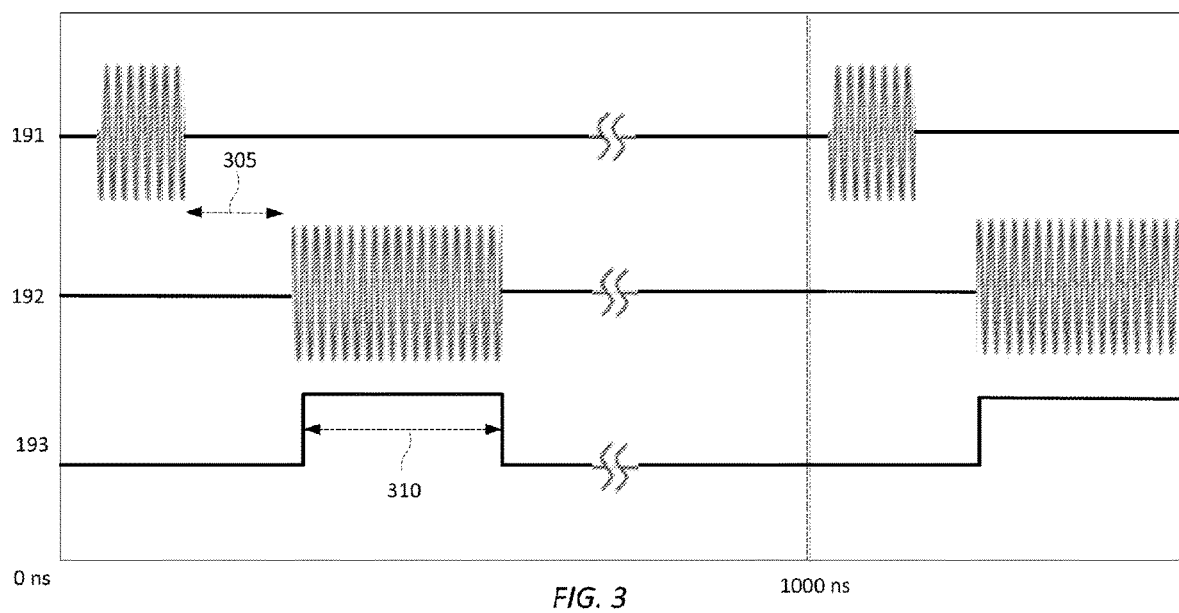
FIG. 3 is a timing diagram for controlling operation of the motion detector of FIG. 1 according to one embodiment.

FIG. 3 illustrates one example of control signals for the transmission circuit 105 and the reception circuit 110. The time gate circuit 120 is configured to generate multiple control signals including the transmission control signal 191 to control the timing of the RF shape generator 130, the mixer control signal 192 to control the timing of the mixer 145, and the sample-and-hold control signal 193 to control the timing of the sample-and-hold circuit 150.

In the example illustrated, the mixer control signal 192 becomes active (for example, is modulated) after the transmission control signal 191 becomes inactive. The timing of the mixer control signal 192 and the sample-and-hold control signal 193 are set by the time gate circuit 120 based on a signal from the input interface 160. In one instance, when the input interface 160 is set to the shortest setting of the detection shell, the mixer control signal 192 and the sample-and-hold control signal 193 become active once the transmission control signal 191 is completed. In other instances, such as the one illustrated, the mixer control signal 192 and the sample-and-hold control signal 193 are delayed by an interval of time 305. The interval of time 305 sets a location of the inner edge of the detection shell (i.e., the edge of the detection shell closest to the motion detector 100) as discussed below.

The reception circuit 110 is preventing from becoming operative once the RF burst transmission is completed. This prevents saturation of the reception circuit 110 with feedback from the RF burst. This also delays detection of motion of objects that are extremely close to the motion detector 100. In one example, motion from objects within 1 foot from the motion detector 100 will be ignored. These objects are ones that may cause false alarms such as spiders or insects crawling on or near to the motion detector 100.

In the example of FIG. 3, the motion detector 100 is configured to have a detection shell of 20 feet to 70 feet from the motion detector 100. The RF burst travels approximately 1 ft/ns. Since the RF burst travels roundtrip to a target and back to the motion detector 100, it takes approximately 2 ns per foot of detection range. In this example, the mixer control signal 192 activates the mixer 145 for 100 ns. This sets the width of the detection shell to 50 feet. RF reflections received after the mixer control signal 192 becomes inactive do not pass through the mixer 145 and do not result in a difference signal or a Doppler signal.

Figure 4:
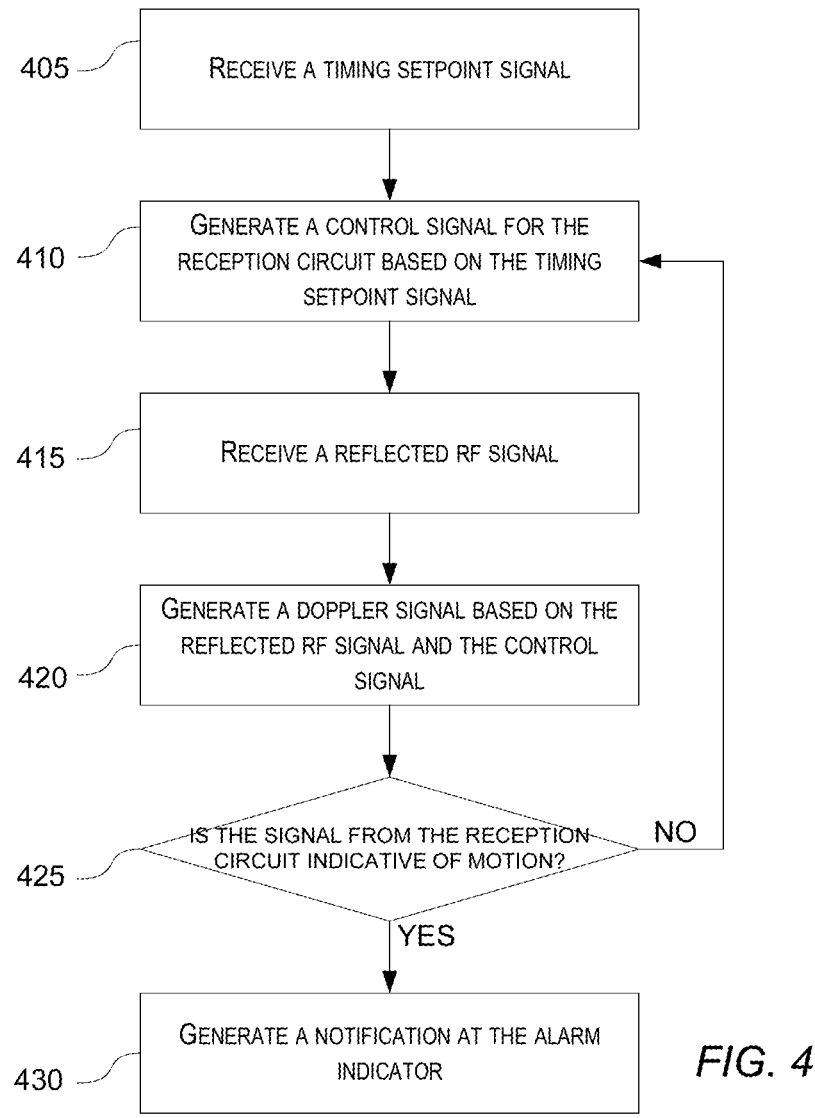
FIG. 4 is a flowchart of a method of operation of the motion detector of FIG. 1 according to one embodiment.

FIG. 4 illustrates a method of operation of the motion detector 100 according to one embodiment. In the method illustrated, a timing setpoint signal is received from the input interface 160 (block 405). The timing setpoint signal is received at the time gate circuit 120. The time gate circuit 120 generates a control signal for the reception circuit 110 based on the timing setpoint signal (block 410). The control signal generated by the time gate circuit 120 may include the mixer control signal 192 and the sample-and-hold control signal 193. The timing setpoint signal thereby sets or adjusts the detection shell. In some embodiments, the timing setpoint signal may only adjust the detection shell by a maximum detection distance. Maximum adjustment ranges may also be incorporated into the time gate circuit 120 including, for example, a 12 feet to 25 feet range of adjustment for the detection shell. In some embodiments, the width of the detection shell is set to 5 feet and the range is set by the timing setpoint signal.

The reception circuit 110 receives a reflected RF signal from objects within the surveillance area (block 415). The reception circuit 110 generates a Doppler signal based on the reflected RF signal and the control signal (block 420). The microcontroller 125 determines when the signal received from the reception circuit 110 is indicative of motion (block 425). The signal is generated based on the received, RF reflections and the mixer control signal 192. The signal is dependent on the amount of motion of an object located within the detection shell. As a consequence, the microcontroller 125 may determine whether a moving object is present within the detection shell and may determine an amount of movement of the object based on the signal.

When the signal from the reception circuit 110 is indicative of motion, the microcontroller 125 generates a notification at the alarm indicator 127 (block 430). In one embodiment, the microcontroller 125 activates the alarm indicator 127 anytime the signal has a magnitude greater than an alarm threshold within the microcontroller 125. In some embodiments, the alarm threshold is adjustable by programming the microcontroller 125. For example, the alarm threshold may be adjusted based on a user input to change the sensitivity of the motion detector 100. Conversely, when the signal from the reception circuit 110 is not indicative of motion, the microcontroller 125 does not generate an alarm notification, but rather continues to monitor the signal from the reception circuit 110.

Figure 5:
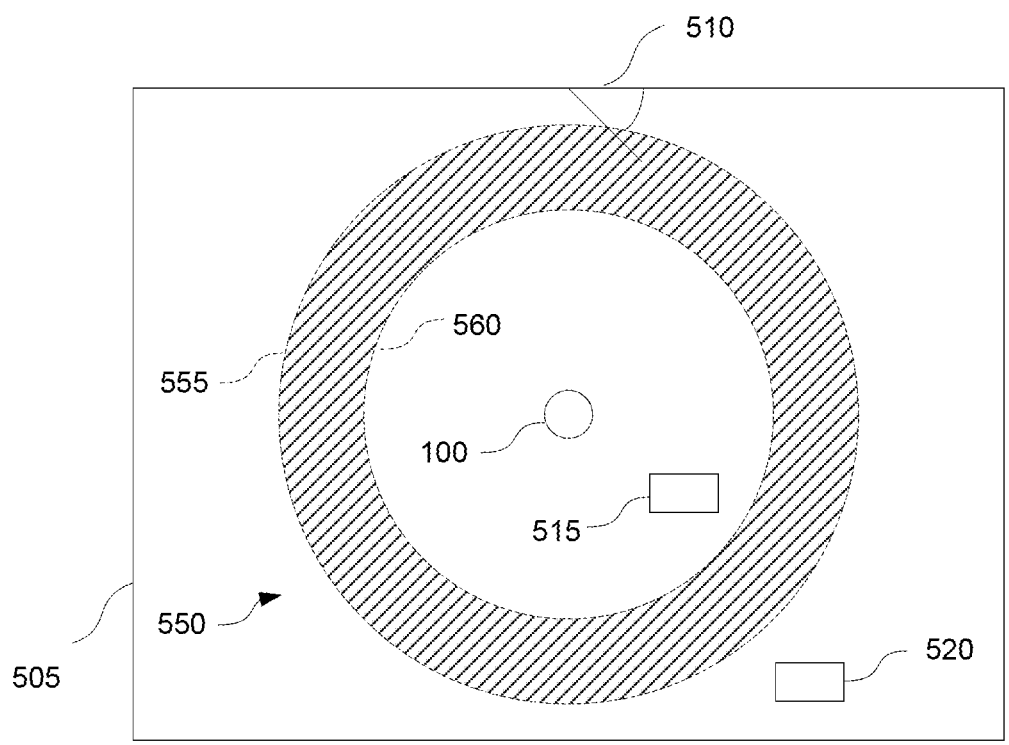
FIG. 5 is a top-down view of an area under surveillance by the motion detector of FIG. 1 according to one example.

FIG. 5 illustrates an example of an area under surveillance by the motion detector 100. The area, as illustrated, is a top-down view of a room 505. In the illustrated example, the room 505 includes an inward-opening door 510, a close object 515, and a far object 520. A detection shell 550 illustrates an area where motion results in generation of the alarm notification by the motion detector 100. An outer edge 555 of the detection shell 550 defines the outer boundary of the detection shell 550. Similarly, an inner edge 560 defines the inner boundary of the detection shell 550. When motion occurs within the detection shell 550, such as opening of the inward-opening door 510, the microcontroller 125 generates a notification at the alarm indicator 127.

Moving objects that are farther from the motion detector 100 than the outer edge 555 are not detected by the microcontroller 125. Moving objects that are closer to the motion detector 100 than the inner edge 560 are also not detected by the microcontroller 125. As a consequence, when the close object 515 is or creates motion near to the motion detector 100, an alarm notification is not triggered.

This is advantageous when the close object 515 moves or creates motion inside the inner edge 560, but that motion is routine or otherwise not of cause for alarm. For example, the close object 515 may be a ceiling fan that could generate false alarms if the inner edge 560 was closer to the motion detector 100. In another example, the close object 515 may be a hanging sign or banner that is easily disturbed by air currents (for example, from a fan, a heating/air-conditioning duct, or opening of an entryway). Setting the inner edge 560 of the detection shell 550 outside of the close object 515 eliminates false alarms due to motion of the close object 515.

Similarly, when motion occurs near to the far object 520, it is not detected by the microcontroller 125 and an alarm notification is not generated. Setting the outer edge 555 of the detection shell 550 closer to the motion detector 100 than the far object 520 results motion near to the far object 520 being ignored by the motion detector 100. Since a user or an installer of the motion detector 100 can set the outer edge 555 and the inner edge 560, false alarms due to motion of the close object 515 and the far object 520 may be reduced or eliminated.

Figure 6:
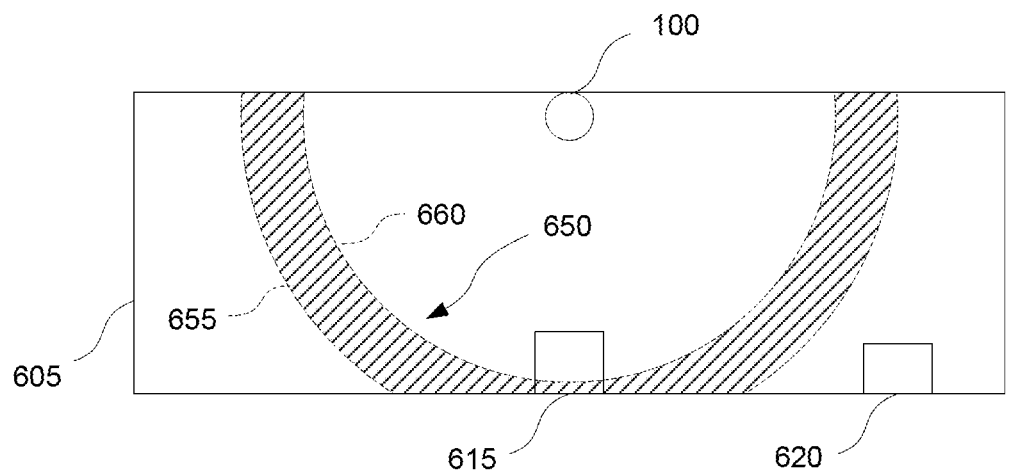
FIG. 6 is a side view of an area under surveillance by the motion detector of FIG. 1 according to another example.

FIG. 6 illustrates another example of an area under surveillance by the motion detector 100. This area, as illustrated, is a side view of a room 605. In the illustrated example, the motion detector 100 is positioned near to the ceiling of the room 605. A detection shell 550 illustrates an area where motion within the area generates the notification to the alarm indicator 127. The detector shell 55 includes an outer edge 660 that defines an outer boundary of the detection shell 650 and an inner edge 660 that defines the inner boundary of the detection shell 650.

An object 615 is located partially within the detection shell 650. When motion occurs near the top of the object 615, alarms due to that motion are not triggered. However, when motion occurs near the bottom of the object 615, alarms due to that motion are triggered. As a consequence, the detection shell 650 may be adjusted to protect particular objects or particular areas around the objects. In the example, a far object 620 is located outside of the detection shell 650. Similar to the far object 520, motion near to the far object 620 does not trigger an alarm notification.

The inner edge 560 and 660 and the outer edge 555 and 655 are adjustable via the input interface 160. Since the detection shell 550 and 650 may be positioned and adjusted such that motion around particular objects may be either ignored or used to trigger alarms, the motion detector 100 is configurable to generate alarm notifications for high security applications. For example, certain objects such as display cases housing valuable items, cash registers, and valuable items themselves may be protected even when innocuous motion occurs near to the items.

In some embodiments, multiple motion detectors 100 may be positioned within an area under surveillance. In this instance, multiple detection shells may be generated within a single area. Additionally, a single motion detector 100 may be configured with multiple reception antennas to generate multiple detection shells. As a consequence, multiple objects may be protected by multiple detection shells within the area under surveillance. The detection shells may also be configured to cover various portions of the area where coverage desired. In some embodiments, a single object may be protected by successive detection shells. In this case, a first detection shell may result in generation of a first alarm and a second detection shell may result in generation of a second alarm. This configuration allows for generation of multiple alarms each indicative of different levels of security concern.

Thus, embodiments of the invention provide, among other things, a motion detector with an adjustable detection shell.

It should be noted that this disclosure includes references to "one embodiment," "an embodiment," and "some embodiments," which do not necessarily refer to the same embodiment. Particular features, structures, or characteristics may be combined in any suitable manner consistent with this disclosure.

It should be noted that the term "based on," as used herein, is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

What is claimed is:

1. A motion detector with an adjustable detection shell, the motion detector comprising:
   an antenna;
   a reception circuit configured to receive a reflected radio frequency (RF) signal via the antenna;
   a time gate circuit electrically connected to the reception circuit and configured to generate a control signal for the reception circuit based on a timing setpoint signal, the timing setpoint signal sent from an input interface and generated based on a selection by a user and defining a range of a detection shell, wherein the detection shell represents an area where motion is detected; and
   an electronic processor electrically connected to the reception circuit and the time gate circuit, the electronic processor configured to
      receive a signal from the reception circuit indicative of motion occurring within the detection shell, the signal based on the reflected RF signal, and
      generate a notification when the signal received from the reception circuit is indicative of motion occurring within the detection shell.

2. The motion detector according to claim 1, wherein the electronic processor is configured to generate the notification when a magnitude of the signal from the reception circuit is greater than a threshold.

3. The motion detector according to claim 2, wherein the electronic processor is configured to adjust the threshold based on a user input.

4. The motion detector according to claim 1, wherein the reception circuit generates a Doppler signal based on the reflected RF signal and a mixer control signal and wherein the timing setpoint signal adjusts timing of the mixer control signal.

5. The motion detector according to claim 1, wherein the timing setpoint signal is received from an input interface and used to adjust timing of control signals generated by the time gate circuit.

6. The motion detector according to claim 5, wherein the input interface includes mechanical inputs positioned on a housing of the motion detector.

7. The motion detector according to claim 5, wherein the time gate circuit is configured to receive the timing setpoint signal from an external computing device.

8. The motion detector according to claim 1, wherein the timing setpoint signal sets an inner edge of the detection shell and an outer edge of the detection shell.

9. The system of claim 8, wherein the timing setpoint signal sets the inner edge of the detection shell based on an interval of time, wherein the interval of time sets a location of the inner edge of the detection shell.

10. The motion detector according to claim 1, wherein the timing setpoint signal sets an average range of the detection shell and a width of the detection shell.

11. The system of claim 1, wherein the detection shell represents an area around an object where motion is detected.

12. A method of operation of a motion detector with an adjustable detection shell, the method comprising:
    receiving, at a time gate circuit, a timing setpoint signal, the timing setpoint signal being sent from an input interface and generated based on a selection by a user and defining a range of a detection shell, wherein the detection shell represents an area where motion is detected;
    generating a control signal by the time gate circuit for a reception circuit based on the timing setpoint signal;
    receiving a reflected RF signal at the reception circuit;
    receiving, at an electronic processor, a signal from the reception circuit indicative of motion occurring within the detection shell; and
    generating, by the electronic processor, a notification when the signal from the reception circuit is indicative of motion occurring within the detection shell.

13. The method according to claim 12, wherein generating the notification occurs when a magnitude of the signal received from the reception circuit is greater than a threshold.

14. The method according to claim 13, further comprising adjusting the threshold based on a user input.

15. The method according to claim 12, further comprising generating a Doppler signal based on the reflected RF signal and a mixer control signal, and adjusting timing of the mixer control signal based on the timing setpoint signal.

16. The method according to claim 12, wherein receiving the timing setpoint signal includes receiving the timing setpoint signal from an input interface and wherein the timing setpoint signal is used to adjust timing of control signals generated by the time gate circuit.

17. The method according to claim 16, wherein receiving the timing setpoint signal includes receiving the timing setpoint signal from mechanical inputs positioned on a housing of the motion detector.

18. The method according to claim 12, wherein receiving the timing setpoint signal includes receiving a setting for an inner edge of the detection shell and an outer edge of the detection shell.

19. The method according to claim 12, wherein receiving the timing setpoint signal sets an average range of the detection shell and a width of the detection shell.

20. The method of claim 12, further comprising:
receiving an updated timing setpoint signal, wherein the updated timing setpoint signal adjusts at least one parameter of the detection shell.

\* \* \* \* \*